Figure 1:
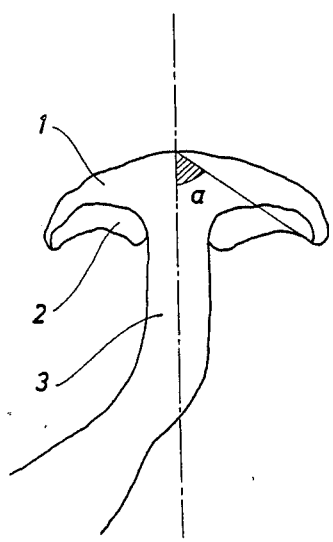

United States Patent [19]

Kawano et al.

[11] Patent Number: 4,940,837

[45] Date of Patent: Jul. 10, 1990

[54] STRAINS AND THEIR CULTIVATION

[75] Inventors: Yukita Kawano; Katsuhiko Kusakabe, both of Otsu; Hitoshi Maruyama, Shiga; Susumu Matsui, Otsu; Tsutomu Taniguchi, Kyoto; Akira Obayashi, Uji, all of Japan

[73] Assignee: Takara Shuzo Co., Ltd., Kyoto, Japan

[21] Appl. No.: 105,342

[22] Filed: Oct. 7, 1987

[30] Foreign Application Priority Data

Oct. 9, 1986 [JP] Japan .................................. 61-239058
Nov. 13, 1986 [JP] Japan .................................. 61-268656

[51] Int. Cl.$^5$ ............................................. A01G 1/04
[52] U.S. Cl. ........................................ 800/200; 47/1.1; 800/DIG. 8
[58] Field of Search .................. 800/1; Plt./89; 47/1.1

Primary Examiner—Robert E. Bagwill
Attorney, Agent, or Firm—Wenderoth, Lind & Ponack

[57] ABSTRACT

The invention provides novel strains of Basidiomycetes and more particularly, novel strains of *Lyophyllum ulmarium*. The novel strains are characterized by having a cap which is not concave when the fruiting body has matured. A process is provided comprising inoculation of *Lyophyllum ulmarium* with a cap which is not concave when the fruiting body has matured on a medium to form the fruiting body.

Also provided is a method comprising the mating of *Lyophyllum ulmarium* Lu 1-8 with other *Lyophyllum ulmarium* and the harvesting of *Lyophyllum ulmarium* with a cap which is not concave when the fruiting body has matured in a term of cultivation up to harvest of the fruiting body that does not exceed 100 days.

7 Claims, 1 Drawing Sheet

STRAINS AND THEIR CULTIVATION

The present invention relates to novel strains of Basidiomycetes, and more particularly, to novel strains of *Lyophyllum ulmarium* and a method for the production thereof by cultivation or the like.

*Lyophyllum ulmarium* grows caespitose or singly on the dead or live wood of a variety of broad-leaved trees in the autumn in nature, and this mushroom has been harvested to be eaten from long ago because of its shape, crispy texture, and excellent flavor. In recent years, sawdust-medium cultivation, in which cultivation is done in a bottle or box with a culture medium obtained by a formulation of rice bran in sawdust, has been established, so that *Lyophyllum ulmarium* can be steadily harvested throughout the year without regard for the season. In the sawdust-medium cultivation of *Lyophyllum ulmarium*, primordia are formed after a Kinkaki (a term of operation which promotes the formation of fruiting), and cultivation is continued until harvest of the fruit bodies can be done.

With the stains that are conventionally cultivated, however, the cap invariably becomes incurved (concave) when the fruiting body has matured, which seriously injures the commercial value of the mushroom.

In view of the situation as described above, the objects of the present invention are to provide new strains of *Lyophyllum ulmarium* that have an advantage in that the cap is not concave (i.e. is convex) when the fruiting body has matured, and also to provide a method for the production thereof by cultivation or the like.

To summarize the present invention, the first aspect of the present invention relates to novel strains of *Lyophyllum ulmarium* characterized by having a cap is not concave when the fruiting body has matured.

A second aspect of the present invention relates to a method for the cultivation of the strains of *Lyophyllum ulmarium* described above, which involves the inoculation onto a medium to form fruiting bodies of the strains of *Lyophyllum ulmarium* for which the cap margin is not concave, when the fruiting body has matured.

A third aspect of the present invention relates to a method for creating a specific strain of *Lyophyllum ulmarium* among the strains described above for the first aspect, which comprises the mating of *Lyophyllum ulmarium* Lu 1-8 with other strains of *Lyophyllum ulmarium* to produce a strain of *Lyophyllum ulmarium* for which the cap is not concave when the fruiting body has matured and for which the time for culture needed until the harvesting of the fruiting bodies does not exceed 100 days.

In the sawduct-medium cultivation of *Lyophyllum ulmarium*, the strains conventionally used characteristically have a cap that is concave when the fruiting body has matured. To overcome this disadvantage, the present inventors screened strains of *Lyophyllum ulmarium* that exist in nature and isolated a strain that we named *Lyophyllum ulmarium* Lu 1-8. When this strain is used, growth is somewhat slow, so a long time is needed for cultivation, which is economically disadvantageous. Therefore, the mating of this strain with other wild-type strains isolated from nature has been extensively tested. We found that with one of the mated strains obtained, the fruiting bodies can be harvested after cultivation in a short period of time, and the cap is not concave when the fruiting body has matured.

The phrase "when the fruiting body has been matured" is used through these specifications to refer to when the the spores have fallen.

The mated strain in the present invention will now be described in detail.

The mated strains were created by the mating of two wild-type strains of *Lyophyllum ulmarium* with each other. As test strains, *Lyophyllum ulmarium* Lu 1-8 and *Lyophyllum ulmarium* Lu 1-17 were used. The former has a desirable property in that the cap is not concave when the fruiting body has matured; however, the total cultivation time needed is long, about 120 days. The latter has cap concaved when the fruiting body has matured, but the total cultivation time needed is only 100 days.

The *Lyophyllum ulmarium* Lu 1-8 tested was collected from fruiting bodies grown caespitose on dead wood in the Daisen district of Tottori Prefecture, Japan, as a pure isolate by the present inventors. The morphological characteristics of the fruiting body and spores are as follows.

Shape: Fruiting body grows single but usually densely caespitose. Cap is 5–15 cm in diameter and convex. Margin is round to elliptical. Surface is smooth and moist, without hairs. Color is white to brownish cream with distinctive darker round spots over the center. Sometimes the cap cracked in the center when overmature. Tissue: Thick, dense, and with a gum-like smell. Color is white. Gills: White, broad, and adnexted on the upper stipes. Stipe: 3–7 cm long, 1–2 cm thick, attached eccentrically and curved. Same color as cap. On upper parts, color is white with cottony or bloomy appearance. Spores: Almost round, smooth, colorless. $4.5-5.5 \times 3.5-4.5$ $\mu$m, white spore print.

From these characteristics and by reference to *Mycological Flora of Japan* by Seiya Ito (Yoken-Do, Tokyo, Japan), vol. 2, No. 5, 1955, this strain has been identified as a strain of *Lyophyllum ulmarium*. This strain has been named *Lyophyllum ulmarium* Lu 1-8 and has been deposited at the Fermentation Research Institute, Agency of Industrial Science and Technology, Japan under the accession number of FERM BP-1416.

Next, various properties of *Lyophyllum ulmarium* Lu 1-8 will be described.

(1) Malt-extract agar culture (25° C.)

With 7 days' incubation, colonies were 41 mm in diameter. Color was white; many aerial hyphae. At 10 days, colonies were 61 mm in diameter, dense, and white. At 17 days, colonies covered the entire surface of the medium, dense and white, stretching straight. Many aerial hyphae.

(2) Potato-glucose agar culture (25° C.)

With 7 days' incubation, colonies were 31 mm in diameter. Color was white; colonies were dense, with many aerial hyphae. At 10 days, colonies were 51 mm in diameter, white, and dense. At 17 days, colonies covered the entire surface of the medium. Many aerial hyphae had grown on the surface of colonies. Mycelia were white.

(3) Zapec-Dox agar culture (25° C.)

With 7 days' incubation, colonies were 30 mm in diameter. Density of colonies was very low; mycelia had many ramifications. Color was white; there were a few aerial hyphae. At 17 days, colonies covered the entire surface of the medium; they were ramified, thin, and white.

(4) Sabouraud agar culture (25° C.)

With 7 days' incubation, colonies were 38 mm in diameter. Color was white; colonies stretched straight and were dense. Aerial hyphae were not numerous. At 10 days, colonies were 57 mm in diameter, white, with a few aerial hyphae. At 17 days, colonies covered the entire surface of the medium.

(5) Oatmeal agar culture (25° C.)

With 7 days' incubation, colonies were 45 mm in diameter. Color was white; many ramifications; a few aerial hyphae. At 10 days, colonies were 70 mm in diameter, dense, and white. Aerial hyphae increased, with cottony appearance. At 17 days, colonies covered the entire surface of the medium. Many aerial hyphae present, with cotton-like appearance. Whitish.

(6) Synthetic mucor agar medium culture (25° C.)

With 7 days' incubation, colonies were 20 mm in diameter, white, radiational growth. Aerial hyphae somewhat dense. At 10 days, colonies were 33 mm in diameter, white, with many aerial hyphae. At 17 days, colonies were 68 mm in diameter, white, with many aerial hyphae.

(7) YpSs agar culture (25° C.)

At 7 days' incubation, colonies were 55 mm in diameter, white, with many mat-like aerial hyphae. At 10 days, colonies were 76 mm in diameter, white, with many mat-like aerial hyphae. At 17 days, mycelia covered the entire surface of the medium with many aerial hyphae, with a cotton-like appearance. White colonies; medium was colored yellow.

(8) Culture on potato-glucose agar containing 0.55 garic acid (25° C.) (for detection of phenol oxidase)

With 7 days' incubation, colonies were 15 mm in diameter, slight growth, white, with many aerial hyphae. Medium was colored light brown. At 17 days, colonies were 20 mm in diameter, with many aerial hyphae. Brownish zone was 40 mm in diameter. New inocula grew more quickly than the old ones.

(9) Optimum temperature for growth of mycelia

We inoculated mycelia grown on agar disk 5 mm in diameter onto PGY agar medium plates, incubated the plates at several different temperatures, and measured the diameter of each colony after 12 days of incubation. From the results, we estimated that the optimum temperature was around 25° C. The strain could not grow at 5° C. or 35° C.

(10) Optimum pH for growth of mycelia

We inoculated mycelia grown on agar chips into PGY liquid medium (PGY agar medium from which the agar had been removed), adjusted the liquid medium to several different pH (each sample, 60 ml), and incubated the mixtures at 25° C. We measured the dry weight of the mycelia after 15 days. From the results, we estimated the optimum pH to be 7.0 to 8.0. This strain could grow at pH 3.5 to 10.0.

Another strain tested, *Lyophyllum ulmarium* Lu 1-17, was collected from fruiting bodies grown caespitose on dead wood in the Okushima district of Mie Prefecture, Japan in a pure isolate by the present inventors. The morphological characteristics of the fruit bodies and spores were as follows.

Fruiting body grows caespitose. Cap: 4.5-1.3 cm in diameter, dish-shaped, convex. Margin is round or elliptical. Surface is smooth, moist, clean brownish color, often with brown over the center. Usually accompanied by indistinct dark round spots. Occasionally the cap is cracked in the center when over-mature. Tissue: white, thick, and dense, smelling weakly gum-like. Gills: white or light pale cream, spaced, and broad. Stripes: attached centrically or eccentrically, 3-7 cm long, 1-2 cm thick, same color as the cap, with bloom. Spores: round, smooth, colorless, $4-5 \times 3.4-4.5$ μm, white spore print.

From these characteristics and by reference to *Mycological Flora of Japan* by Seiya Ito (Yoken-Do, Tokyo, Japan), vol. 2, No. 5, 1955, this strain has been identified as a strain of *Lyophyllum ulmarium*. The strain was named *Lyophyllum ulmarium* Lu 1-17 and has been deposited at the Fermentation Research Institute, Agency of Industrial Science and Technology, Japan, under the accession number of FERM BP-1417.

These two wild-type strains were mated in the usual way, as follows.

For example, the cap of a fruiting body of *Lyophyllum ulmarium* Lu 1-8 grown on the medium of a mixture of sawdust and rice bran had its stipes cut off, and these were made to adhere to the cover of a sterilized Petri dish. The preparation was left at 15° C. for 2 days, at which time the spores fell down. Sterilized water was put into the Petri dish to make a spore suspension. After the suspension was diluted to the concentration of $1 \times 10^4$/ml, some of it was used to inoculate PGY agar plate medium (0.2% polypeptone, 0.2% yeast extract, 2% glucose, 0.05% $KH_2PO_4$, 0.05% $MgSO_4.7H_2O$, and 2% agar). The plate was cultured at 25° C. for 7 to 10 days. Monokaryons that had germinated on the medium were obtained under a stereoscopic microscope; about 50 monokaryons were isolated. From *Lyophyllum ulmarium* Lu 1-17 treated in the same way, about 50 more monokaryons were obtained.

The monokaryons of both strains were inoculated around the center of a PGY agar plate with about 1 cm between them. After the plate was cultured at 25° C. for 7 days, some of each colony was sampled and strains that were found to have undergone dikaryotization under an optical microscope were isolated onto PGY agar slant medium. Thus, some 100 mated strains of *Lyophyllum ulmarium* Lu 1-8 and Lu 1-17 were obtained. Among these 100 strains, the 20 strains with the most rapid grow rate were selected and inoculated on sawdust-rice bran medium. From the fruiting bodies formed, the five most satisfactory strains were chosen and the fruit bodies were again allowed to form in sawdust-rice bran medium. The best strain was selected and named *Lyophyllum ulmarium* M-8171.

This M-8171 strain is named *Lyophyllum ulmarium* M-8171 and it has been deposited at the Fermentation Research Institute, Agency of Industrial Science and Technology, Japan under the accession number of FERM BP-1415.

Next, various properties of *Lyophyllum ulmarium* M-8171 will be described.

(1) Malt extract agar culture (25° C.)

With 7 days' incubation, vigorous growth, colonies 41 mm in diameter, white, with dense mycelia and many aerial hyphae. At 10 days, colonies covered the entire surface of the medium. At 17 days, dense aerial hyphae grow over all. Color: white.

(2) Potato glucose agar culture (25° C.)

With 7 days' incubation, vigorous growth, colonies 37 mm in diameter, white and dense, many aerial hyphae. At 10 days, colonies covered the entire surface of the medium. At 17 days, aerial hyphae grow over all; white, but light yellow in center.

(3) Zapec-Dox agar culture (25° C.)

With 7 days' incubation, little growth, colonies 25 mm in diameter, very thin and ramified, with few aerial hyphae. At 17 days, colonies covered the entire surface of the medium. Mycelium ramified, white, thin.

(4) Sabouraud agar culture (25° C.)

With 7 days' incubation, vigorous growth, colonies 42 mm in diameter; white, dense mycelia with a cotton-like appearance and many aerial hyphae. At 10 days, colonies covered the entire surface of the medium. Aerial hyphae grew strongly; cottony and white.

(5) Oatmeal agar culture (25° C.)

With 7 days' incubation, vigorous growth, colonies 37 mm in diameter. Mycelia had many ramifications, with few aerial hyphae. At 10 days, colonies covered the entire surface of the medium, with many aerial hyphae like cotton. Color: white.

(6) Synthetic mucor agar culture (25° C.)

With 7 days' incubation, little growth, colonies 23 mm in diameter, white, stretched straight and radiating. At 17 days, colonies covered entire surface of medium with many aerial hyphae; white.

(7) YpSs agar culture (25° C.)

With 7 days' incubation, vigorous growth, colonies 42 mm in diameter, white, dense, and many aerial hyphae. Colonies mat-like. At 10 days, colonies covered entire surface of the medium. Many aerial hyphae grew over all. Colonies were white. Medium was colored yellow.

(8) Culture on potato-glucose agar containing 0.5% garic acid (for detection of Phenol oxidase)

With 7 days' incubation, little growth, colonies 19 mm in diameter, white, mat-like, few aerial hyphae; brownish zone was 39 mm in diameter. At 17 days, normal growth, colonies 38 mm in diameter, brown zone was 40 mm in diameter. New inocula grew twice as fast as old ones.

(9) Optimum temperature for growth of mycelia

We inoculated mycelia grown on an agar disk 5 mm in diameter to PGY medium agar and incubated the cultures at several different temperatures. We measured the diameter of each colony after 12 days of incubation. From the results, we estimated the optimum temperature to be around 25° C. and found that this strain could not grow at 5° C. or 35° C.

(10) Optimum pH for growth of mycelia

We inoculated mycelia grown on agar chips to PGY liquid medium and adjusted the medium to several different pH (each sample, 60 ml) and incubated the mixtures at 25° C. After 15 days of incubation, we measured the dry weight of the mycelia. From the results, we estimated the optimum pH to be 7.0 to 8.0. This strain could grow on pH 3.5 to 10.0.

Next, to learn how to distinguish *Lyophyllum ulmarium* M-8171 from other strains of *Lyophyllum ulmarium*, we examined differentiation by sex factor by dual culture on agar medium, based on the taxonomic finding that the hyphae of different strains are different from each other. The strains of *Lyophyllum ulmarium* examined were *Lyophyllum ulmarium* IFO 9637, *Lyophyllum ulmarium* IFO 30525, *Lyophyllum ulmarium* IFO 30775, *Lyophyllum ulmarium* Lu 1-8, *Lyophyllum ulmarium* Lu 1-17, *Lyophyllum ulmarium* Lu 1-2, and three strains of *Lyophyllum ulmarium* purchased from supply companies for inocula. *Lyophyllum ulmarium* Lu 1-2 is a wild-type strain collected and isolated by the present inventors in pure form in the Kiritsumi district of Gunma Prefecture, Japan. The three strains purchased from the supply companies for inocula were strains of *Lyophyllum ulmarium* purchased from K.K. Kamiko Inocula Research Labpratories, Nippon Norin Inocula K.K., and Fujita Shokuyo Kin Research Laboratories. Dikaryons of each strain were excised from a stock culture (PGY agar slant medium) as a block of 3 mm×3 mm ×3 mm and inoculated dually into a dikaryon block (3 mm ×3 mm×3 mm)of *Lyophyllum ulmarium* M-8171. After culture at 25° C. for 14 days, we judged whether an inhibition line had formed at the interface between the colonies or not. The results are shown in Table 1 (+: inhibition line was formed; —: no inhibition line was formed).

TABLE 1

| *Lyophyllum ulmarium* | Inhibition Line |
|---|---|
| IFO 9637 | + |
| IFO 30525 | + |
| IFO 30775 | + |
| Lu 1-8 | + |
| Lu 1-17 | + |
| Lu 1-2 | + |
| K.K. Kamiko Inocula Research Laboratories | + |
| Nippon Norin Inocula K.K. | + |
| Fujita Shokuyo Kin Research Laboratories | + |

As shown in Table 1, the strains described above all formed an inhibition line during dual culture with *Lyophyllum ulmarium* M-8171. From this, it is evident that *Lyophyllum ulmarium* M-8171 is a new strain.

Dual culture of *Lyophyllum ulmarium* Lu 1-8 with each strain described above (excluding the Lu 1-8 strain) was done as described above. The strains all formed an inhibition line and therefore, *Lyophyllum ulmarium* Lu 1-8 was also a new strain.

Next, the curving of the cap of the fruiting bodies characteristic of the new strains of the present invention will be described.

Table 2 shows the results obtained by cultivation tests of *Lyophyllum ulmarium* M-8171, *Lyophyllum ulmarium* Lu 1-8, and the wild-type strain *Lyophyllum ulmarium* Lu 1-2 in which the fruit body was formed and the curving of the cap was measured.

*Lyophyllum ulmarium* M-8171, *Lyophyllum ulmarium* Lu 1-8, and the wild-type strain *Lyophyllum ulmarium* Lu 1-2 were allowed to be a Kinkaki after culture for 61 days, 93 days, and 94 days, respectively.

Angle a of the cap was measured as shown in FIG. 1. FIG. 1 is a cross-sectional outline of the fruiting body showing the place where angle a was measured. In FIG. 1, symbols 1, 2, and 3 mean the cap, gills, and stipes, respectively.

As shown in FIG. 1, angle a is formed by a straight line connecting the crossing point of the vertical line in this drawing and the top of the cap with the margin of the cap. Accordingly, if the cap is concave, angle a becomes large.

TABLE 2

| *Lyophyllum ulmarium* | Days of culture after a Kinkaki | Total days of cultivation | Fall-ing of spores | Angle a (degrees) | Amount har-vested (g) |
|---|---|---|---|---|---|
| M-8171 | 20 | 81 | — | 62 | 107 |
|  | 22 | 83 | — | 64 | 115 |
|  | 23 | 84 | — | 64 | 122 |
|  | 25 | 86 | + | 65 | 130 |
|  | 28 | 89 | + | 65 | 137 |
| Lu 1-8 | 20 | 113 | — | 64 | 108 |
|  | 22 | 115 | — | 65 | 112 |
|  | 23 | 116 | — | 65 | 118 |
|  | 25 | 118 | + | 67 | 122 |
|  | 28 | 121 | + | 67 | 134 |
| Lu 1-2 | 20 | 114 | — | 74 | 105 |
|  | 22 | 116 | — | 88 | 115 |
|  | 23 | 117 | — | 90 | 125 |
|  | 25 | 119 | + | 103 | 136 |
|  | 28 | 122 | + | 115 | 137 |

Test conditions were as follows. A sawdust solid culture medium was prepared by the thorough mixing of 50 g of sawdust from a conifer, 50 g of sawdust from a broad-leaved three, and 90 g of rice bran. The moisture content was brought to 65% with tap water and the mixture was press-bottled in a polypropylene wide-mouthed bottle with a volume of 850 ml. After the bottle was autoclaved with steam at 120° C. for 60 minutes. A solid inoculum of *Lyophyllum ulmarium* was inoculated into the medium, which was cultured in the dark at 25° C. and with the humidity of 50% for 25 days to give cultured hyphae.

The cultured hyphae were further cultured under the same conditions (*Lyophyllum ulmarium* M-8171, *Lyophyllum ulmarium* Lu 1-8, and *Lyophyllum ulmarium* Lu 1-2 for 36 days, 68 days, and 69 days, respectively) to give fruiting bed. After a Kinkaki, 20 ml of tap water was added and the water allowed to be absorbed. Then, non-adsorbed water was removed and culture was done for 9 days with light of 20 lux at 15° C. and the humidity of 90% to give a fruiting bed. The culture was continued for 11 to 14 days more with light of 200 lux to give matured fruit bodies and for 16 to 19 days to give fully matured fruit bodies.

As is clear from Table 2, with *Lyophyllum ulmarium* M-8171 and *Lyophyllum ulmarium* Lu 1-8, the cap was not concave when the fruiting bodies had matured, whereas in *Lyophyllum ulmarium* Lu 1-2, the cap was markedly concave and the commercial value was clearly injured.

As described above, examples of the novel strains of the present invention include *Lyophyllum ulmarium* M-8171 and *Lyophyllum ulmarium* Lu 1-8 but all strains with the characteristics described above and belonging to the species of *Lyophyllum ulmarium* are all included as novel strains of the present invention.

Next, the artificial cultivation of *Lyophyllum ulmarium* Lu 1-17, one of the parent strains of *Lyophyllum ulmarium* M-8171, will be described as an experiment.

Experiment 1

Fifty grams of the sawdust from a conifer, 50 g of sawdust from a broad-leaved tree, and 90 g of rice bran were thoroughly mixed and the moisture content was brought to 65% with tap water. The resultant mixture was press-bottled in a polypropylene wide-mouthed bottle with a volume of 850 ml. After a hole with a diameter of 1 cm was made from the center of the mouth of the bottle toward the bottom, a solid inoculum of *Lyophyllum ulmarium* Lu 1-17 (FERM BP-1417) was inoculated on the sawdust solid culture medium stoppered with a cap that had been autoclaved with steam at 120° C. for 60 minutes.

The medium was cultured in the dark at 25° C. and with a humidity of 50% for 25 days to give cultured hyphae.

The cultured hyphae were further cultured under the same conditions for 53 days to give fruiting bed.

After a Kinkaki, 20 ml of tap water was added and allowed to absorbed therein. Then, non-adsorbed water was removed and culture was done for 10 days with light of 20 lux at 15° C. and the humidity of 90% to give a primordia. The culture was continued for 16 days more with light of 200 lux to give matured fruiting bodies. The matured fruiting bodies obtained was of a flat dish shape and concave. The amounts obtained of the matured fruiting bodies were 124 g(total days of cultivation, 104 days).

Hereafter examples of artificial cultivation of the new *Lyophyllum ulmarium* strains in accordance with the present invention will be shown, but the present invention is not deemed to be limited only thereto.

EXAMPLE 1

*Lyophyllum ulmarium* M-8171 (FERM BP-1415) was inoculated onto 100 ml of medium composed of 2.0% glucose, 0.2% peptone, 0.2% yeast extract, 0.05% $KH_2PO_4$, and 0.05% $MgSO_4.7H_2O$ (pH 5.5). Culture was done at 25° C. for 10 days to give a liquid seed culture. Separately, 50 g of sawdust from a conifer, 50 g sawdust from a broad-leaved tree, and 90 g of rice bran were thoroughly mixed and the moisture content was brought to 65% with tap water. This mixture was press-bottled in a polypropylene wide-mouthed bottle with a volume of 850 ml. After a hole with a diameter of 1 cm was made from the center of the mouth of the bottle toward the bottom, the bottle was stoppered with a cap. The sawdust solid culture thus obtained was autoclaved with steam at 120° C. for 60 minutes and cooled. Then, 20 ml of the liquid seed medium described above was inoculated onto the medium.

The culture was cultured in the dark at 25° C. with the humidity of 50% for 25 days, by which time mycelia covered the entire surface of the sawdust medium, giving cultured hyphae. These cultured hyphae were cultured under the same conditions for 34 days more to give a fruiting bed. After a Kinkaki, 20 ml of tap water was added and allowed to become absorbed. Thereafter, non-adsorbed water was removed and culture was done for 9 days with light of 20 lux at 15° C. and the humidity of 90% to allow primordia to form. After the light was increased to 200 lux, the culture was continued for 19 days more to give matured fruiting bodies. The matured fruiting bodies obtained had cap not concaved and a convex shape. The amounts obtained of the matured fruiting body were 128 g (total days of cultivation, 87 days). The fruiting bodies had no gum-like smell, and the taste was very good.

EXAMPLE 2

Fifty grams of sawdust from a conifer, 50 g of sawdust from a broad-leaved tree, and 90 g of rice bran were thoroughly mixed and the moisture content was brought to 65% with tap water. This mixture was press-bottled in a polypropylene wide-mouthed bottle with a volume of 850 ml and autoclaved. Then, a hole with a diameter of 1 cm was made from the center of the mouth of the bottle toward the bottom. The solid inoculum obtained as in Example 1 after a Kinkaki was inoculated on the sawdust solid culture medium thus obtained.

The culture medium was cultured in the dark at 25° C. and with humidity of 50% for 25 days to give cultured hyphae. Then the cultured hyphae were cultured under the same conditions for 32 days more to give the fruiting bed. After a Kinkaki, 20 ml of tap water was added and allowed to become absorbed. Then, non-adsorbed water was removed and culture was done for 10 days with light of 20 lux at 15° C. and the humidity of 90% to allow primordia to form. A paper sheet 28 cm long and 15 cm wide was wound around the mouth of the culture bottle and clipped on with a plastic paper clip (paper winding). Culture was continued for 21 days more under the same conditions to give matured fruiting bodies. The matured fruiting bodies obtained had cap not concaved and an enokitake mushroom shape. The amounts obtained of the matured fruiting bodies were 130 g (total days of cultivation, 88 days).

The fruiting bodies had no gum-like smell, and their flavor was very good.

EXAMPLE 3

Fifty grams of sawdust from a conifer, 50 g of sawdust from a broad-leaved tree, and 90 g of rice bran were thoroughly mixed and then the moisture content was brought to 65% with tap water. The mixture was press-bottled in a polypropylene wide-mouthed bottle with a volume of 850 ml and autoclaved. Then, a hole with a diameter of 1 cm was made from the center of the mouth of the bottle toward the bottom. A solid inoculum of *Lyophyllum ulmarium* Lu 1-8 (FERM BP-1416) was inoculated onto the sawdust solid culture medium and stoppered with a cap.

The culture medium was cultured in the dark at 25° C. and with the humidity of 50% for 25 days to give cultured hyphae. Then the cultured hyphae were cultured under the same conditions for 66 days more to give a fruiting bed. After a Kinkaki, 20 ml of tap water was added and allowed to become absorbed. Then, non-adsorbed water was removed and culture was done for 10 days with lighting of 20 lux at 15° C. and the humidity of 90% to allow the primordia. After the light was increased to 200 lux, the culture was continued for 18 days more to give matured fruiting bodies. The matured fruiting bodies obtained had cap not concaved and a convex shape. The amounts obtained of matured fruiting bodies were 123 g (total days of cultivation, 118 days).

COMPARATIVE EXAMPLE 1

Results of a test with *Lyophyllum ulmarium* Lu 1-2 are shown below as Comparative Example 1.

*Lyophyllum ulmarium* Lu 1-2 was inoculated on 100 ml of PGY medium composed of 2.0% glucose, 0.2% peptone, 0.2% yeast extract, 0.05% $KH_2PO_4$, and 0.05% $MgSO_4.7H_2O$ (pH 5.5). Culture was done at 25° C. for 10 days to give a liquid seed culture. Separately, 50 g of sawdust from a conifer, 50 g of sawdust from broad-leaved tree, and 90 g of rice bran were thoroughly mixed and the moisture content was brought to 65% with tap water. This mixture was press-bottled in a polypropylene wide-mouthed bottle with a volume of 850 ml. After a hole with a diameter of 1 cm was made from the center of the mouth of the bottle toward the bottom and was autoclaved, 20 ml of the liquid seed culture was inoculated onto the sawdust solid culture medium. The bottle was stoppered with a cap.

The culture medium was cultued in the dark at 25° C. and with the humidity of 50% for 25 days to give cultured hyphae. Then the cultured hyphae were cultured under the same conditions for 66 days more to give a fruiting bed. After a Kinkaki, 20 ml of tap water was added and allowed to become absorbed. Then, non-adsorbed water was removed and culture was done for 10 days with lighting of 20 lux at 15° C. and with the humidity of 90% to allow the primordia. After the light was increased to 200 lux, the culture was continued for 17 days more to give matured fruiting bodies. The matured fruiting bodies obtain was a flat dish shape and the cap was concaved. The amounts obtained of the matured fruiting bodies were 130 g (total days of cultivation, 118 days). A somewhat gum-like smell was noted in the fruiting bodies.

As described above, *Lyophyllum ulmarium* with a cap is not concave and with excellent qualities as a food can be obtained by the present invention.

What we claim is:

1. *Lyophyllum ulmarium* characterized by a cap which is not concave when the fruiting body has matured.

2. *Lyophyllum ulmarium* as claimed in claim 1 wherein said *Lyophyllum ulmarium* is *Lyophyllum ulmarium* M-8171.

3. *Lyophyllum ulmarium* as claimed in claim 1 wherein said *Lyophyllum ulmarium* is *Lyophyllum ulmarium* Lu 1-8.

4. A method for the cultivation of *Lyophyllum ulmarium* that comprises inoculation of *Lyophyllum ulmarium* with a cap which is not concave when the fruiting body has matured on a medium to form the fruiting body.

5. The method as claimed in claim 4 wherein said *Lyophyllum ulmarium* is *Lyophyllum ulmarium* M-8171.

6. The method as claimed in claim 4 wherein said *Lyophyllum ulmarium* is *Lyophyllum ulmarium* Lu 1-8.

7. A method for creating *Lyophyllum ulmarium* that comprises the mating of *Lyophyllum ulmarium* Lu 1-8 with other *Lyophyllum ulmarium* and the harvesting of *Lyophyllum ulmarium* with a cap which is not concave when the fruiting body has matured in a term of cultivation up to harvest of the fruiting body that does not exceed 100 days.

* * * * *